(12) United States Patent
Wong et al.

(10) Patent No.: US 10,986,571 B2
(45) Date of Patent: *Apr. 20, 2021

(54) IMPLICIT POWER MANAGEMENT MODE AND STATE TRANSITIONS

(71) Applicant: Apple Inc., Cupertino, CA (US)

(72) Inventors: Chiu Ngok E. Wong, San Jose, CA (US); Syed A. Mujtaba, Santa Clara, CA (US); Christiaan A. Hartman, San Jose, CA (US); Joonsuk Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,378

(22) Filed: Sep. 19, 2018

(65) Prior Publication Data

US 2019/0124593 A1 Apr. 25, 2019

Related U.S. Application Data

(63) Continuation of application No. 15/142,212, filed on Apr. 29, 2016, now Pat. No. 10,129,826.

(Continued)

(51) Int. Cl.
*H04W 52/02* (2009.01)
*H04L 5/00* (2006.01)
(Continued)

(52) U.S. Cl.
CPC ....... *H04W 52/0209* (2013.01); *H04L 5/0055* (2013.01); *H04W 28/14* (2013.01);
(Continued)

(58) Field of Classification Search
CPC . H04W 52/0209–0216; H04W 52/0225–0241; Y02D 70/14–146; Y02D 30/70
See application file for complete search history.

(56) References Cited

U.S. PATENT DOCUMENTS

| 6,192,230 B1 | 2/2001 | Van Bokhorst et al. |
| 2005/0003794 A1 | 1/2005 | Liu |

(Continued)

OTHER PUBLICATIONS

Chinese Patent Application No. 201610285590.6—First Office Action dated Mar. 5, 2019.
(Continued)

*Primary Examiner* — Pao Sinkantarakorn
(74) *Attorney, Agent, or Firm* — Dickinson Wright RLLP

(57) ABSTRACT

A station (STA) of a wireless local area network (WLAN) transitions implicitly between power management (PM) modes or PM states, without providing an explicit indication of the PM mode/state change to an access point (AP) of the WLAN. Transitions include changes between an active mode and a power save (PS) mode, or between an awake state and a doze state of the PS mode. Transitions occur immediately after receipt of a beacon indicating pending data for the STA, after an offset time indicated in the beacon, or at a specific wake time negotiated with the AP. After data reception is complete, the STA transitions implicitly to the PS mode or a doze state of the PS mode, after a power save inactivity timeout period or after receiving an indication that data transmission is complete.

19 Claims, 6 Drawing Sheets

Related U.S. Application Data

(60) Provisional application No. 62/156,109, filed on May 1, 2015.

(51) Int. Cl.

| | | |
|---|---|---|
| *H04W 28/14* | (2009.01) | |
| *H04W 40/00* | (2009.01) | |
| *H04W 40/24* | (2009.01) | |
| *H04W 84/12* | (2009.01) | |
| *H04W 88/02* | (2009.01) | |
| *H04W 88/08* | (2009.01) | |

(52) U.S. Cl.
CPC ....... *H04W 40/005* (2013.01); *H04W 40/244* (2013.01); *H04W 52/0216* (2013.01); *H04W 52/0229* (2013.01); *H04W 84/12* (2013.01); *H04W 88/02* (2013.01); *H04W 88/08* (2013.01); *Y02D 30/70* (2020.08)

(56) References Cited

U.S. PATENT DOCUMENTS

| | | |
|---|---|---|
| 2005/0047386 A1 | 3/2005 | Yi |
| 2014/0135051 A1 | 5/2014 | Ghosh |
| 2014/0321349 A1 | 10/2014 | Seok et al. |
| 2016/0219510 A1* | 7/2016 | Asterjadhi ........ H04W 52/0212 |
| 2016/0323820 A1 | 11/2016 | Wong et al. |
| 2016/0330689 A1 | 11/2016 | Park et al. |

OTHER PUBLICATIONS

"IEEE Standard for Information technology—Telecommunications and information exchange between systems Local and metropolitan area networks—Specific requirements: Part 11: Wireless LAN Medium Access Control (MAC) and Physical Layer (PHY) Specifications", IEEE Std 802.11-2012 (Revision of IEEE Std 802.11-2007), IEEE Computer Society, Mar. 29, 2012, 2791 pages.

Park, "IEEE P802.11 Specification Framework for TGah", IEEE 802.11-11/1137r15, May 14, 2013, pp. 1-76.

European Patent Application No. 16167726.5—Extended European Search Report dated Jul. 27, 2016.

European Patent Application 16167726.5—Examination Report dated Aug. 7, 2017.

* cited by examiner

IMPLICIT POWER MANAGEMENT MODE AND STATE TRANSITIONS

CROSS-REFERENCE TO RELATED APPLICATIONS

This Application is a continuation application of U.S. patent application Ser. No. 15/142,212, entitled "IMPLICIT POWER MANAGEMENT MODE AND STATE TRANSITIONS," filed Apr. 29, 2016, now U.S. Pat. No. 10,129,826, issued Nov. 13, 2018, which claims the benefit of U.S. Provisional Application No. 62/156,109, entitled "IMPLICIT POWER MANAGEMENT MODE AND STATE TRANSITIONS", filed May 1, 2015, the contents of which are incorporated by reference herein in their entirety for all purposes.

FIELD

The described embodiments generally relate to wireless communication technology, including implicit power management mode and state transitions for wireless local area network (WLAN) stations (STAs) associated with WLAN access points (APs).

BACKGROUND

Wireless communication technology continues to be incorporated in more electronic devices as consumer's appetites for connectivity by various means continue to grow. Wireless communication devices as varied as portable computers to wearable computing devices include wireless circuitry (also referred to as radios) for both wireless personal area network (WPAN) communication, e.g., Bluetooth®, and wireless local area network (WLAN) communication, e.g., Wi-Fi. In addition to offering connectivity, wireless communication devices include power management capabilities to extend the battery life between charges. Existing power management capabilities in the Institute of Electrical and Electronics Engineers (IEEE) 802.11 wireless communication protocol specifications, e.g., 802.11-2012, require explicit communication between a station (STA) and an access point (AP) when transitioning between different power management modes or states. Power management modes include an active mode, in which the STA is always in an awake state, and a power save mode, in which the STA can be in the awake state or in a doze state. The STA can indicate a change in its power management mode to an AP by transmitting a frame with a power management (PM) bit set to a particular value in a frame control field of the transmitted frame. Similarly, the STA can indicate a change in its power management state by transmitting various types of frames to the AP including "null" frames when the STA has no uplink data frames to send to the AP. Any change to the power management state of the STA is initiated by the STA and explicitly indicated to the AP by a frame exchange handshake, where at least one frame exchange is required for each transition between power management modes or power management states. By having to signal explicitly a power management mode or state transition, the STA must delay entering a more power efficient state, which consumes more power, and must send additional signaling messages, which increases network congestion. With implicit power management mode and state transitions, wireless communication devices, including a STA, can improve their power consumption efficiency and reduce their traffic loading on a WLAN on which the wireless communication device operates.

SUMMARY

A station (STA) of a wireless local area network (WLAN) transitions implicitly between different power management modes or between different power management states within a power management mode without providing an explicit indication of the power management mode change or power management state change to an access point (AP). The AP maintains a power management mode status and/or power management state status for each STA with which the AP is associated. Rather than sending an explicit indication of the power management mode change or power management state change to the AP, the STA transitions implicitly between different power management modes and/or between different power management states of a power management mode based on an agreed upon mechanism known to both the STA and the AP. Implicit transitions can include from an active mode to a power save mode, from a power save mode to an active mode, from an awake state to a doze state within a power save mode, and from a doze state to an awake state within a power save mode.

In some embodiments, the AP indicates pending data for the STA by setting a corresponding bit in a traffic indication map (TIM) information element (IE) of a beacon signal broadcast by the AP to associated STAs. The STA monitors the beacon signal to determine when pending data is available and subsequently transitions to an active mode (from a power save mode) or from a doze state to an awake state (of a power save mode) in order to be ready to receive the pending data. The STA transitions implicitly without indicating a change in power management mode or power management state to the AP. In some embodiments, the STA transitions immediately after receipt of the beacon transmission. In some embodiments, the STA transitions after an offset time subsequent to receipt of the beacon transmission, where the offset time or indication thereof is included in the beacon transmission. In some embodiments, the STA transitions at a specific wake time agreed upon between the AP and the STA, e.g., at a target wake time (TWT).

After data reception by the STA completes, the STA transitions implicitly to a more power efficient state, such as from the active mode to a power save mode and/or from an awake state to a doze state of the power save mode. In some embodiments, the STA transitions after a power save inactivity timeout period. In some embodiments, the STA additionally and/or alternatively transitions after receiving an indication that data transmission is complete from the AP, e.g., based on an indication of "More Data=0" or an "End of Service Period (EOSP)=1" indication in a protocol data unit (PDU) received from the AP.

Implicit power management mode transitions and/or power management state transitions reduce traffic loading on the WLAN by avoiding explicit frame exchanges having particular power management (PM) bit values to indicate power management mode/state changes, by not requiring polling frames for power save mode transitions, and/or by not using triggered data frames for power save mode transitions. Power consumption, by a STA that uses implicit power management mode transitions and/or power management state transitions, is reduced relative to a STA that uses explicit power management mode/state transitions, as transmission of frame exchanges to realize power management mode/state transitions is not required.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
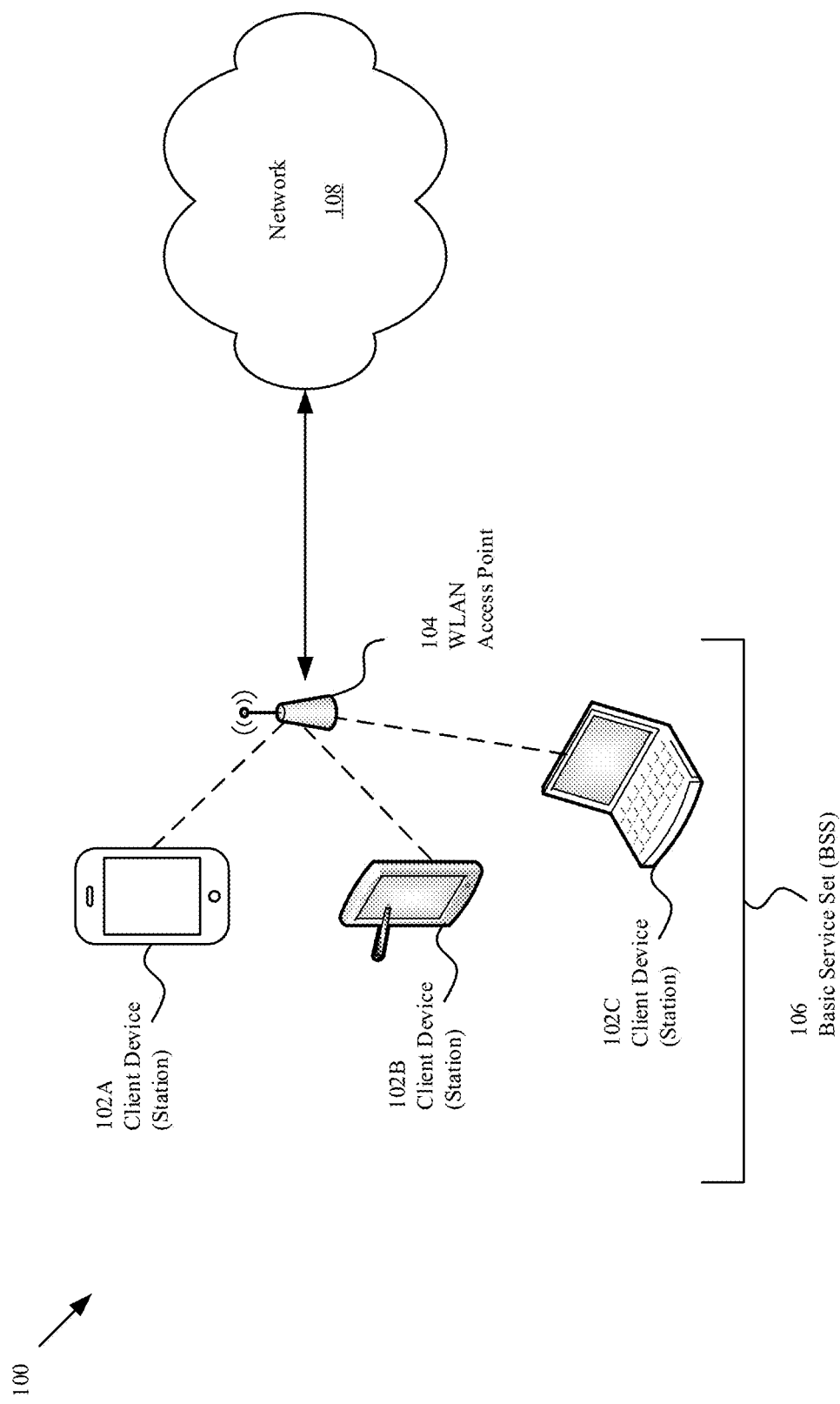
FIG. 1 illustrates an example wireless communication system, in accordance with some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless local area networks can include a set of "client" wireless communication devices, which can also be referred to as stations (STAs), in communication with one or more "central" wireless communication devices, which can also be referred to as access points (APs), to form a basic service set (BSS). A STA can transition between different power management modes or between different power management states within a power management mode. The AP can maintain a power management mode and/or power management state status for each STA with which the AP is associated. Rather than sending an explicit indication to the AP to indicate a change in a power management mode or a power management state, a STA can transition implicitly between different power management modes and/or between different power management states of a power management mode based on an agreed upon mechanism known to both the STA and the AP. Implicit transitions can include from an active mode to a power save mode, from a power save mode to an active mode, from an awake state to a doze state within a power save mode, and from a doze state to an awake state within a power save mode.

The AP can indicate that pending data is available for transmission to the STA by setting a corresponding bit in a traffic indication map (TIM) information element (IE) of a beacon signal broadcast by the AP to associated STAs. The STA can monitor the beacon signal to determine when pending data is available at the AP and can subsequently transition to an active mode (from a power save mode) or from a doze state to an awake state (of a power save mode) in order to be ready to receive the pending data. The STA can transition implicitly without indicating a change in power management mode or power management state to the AP, and the AP can know that the STA supports such an implicit transition between power management modes and/or between power management states. The STA can transition to the active mode or to the awake state of the power save mode immediately after the beacon transmission, or after an offset time after the beacon transmission, where the offset time can be indicated in the beacon transmission. Additionally and/or alternatively, the STA can transition to the active mode or to the awake state of the power save mode at a specific wake time negotiated with the AP by the STA, e.g., at a target wake time (TWT).

After data reception by the STA is complete, the STA can transition implicitly to a more power efficient state, such as from the active mode to a power save mode and/or from an awake state to a doze state of the power save mode. The capability of the STA to transition implicitly from the active mode to the power save mode and/or from the awake state to the doze state of the power save mode can be known by the AP. The STA can transition after a power save inactivity timeout period. The STA can additionally and/or alternatively transition after receiving an indication that data transmission is complete from the AP, e.g., based on an indication of "More Data=0" and/or an "End of Service Period (EOSP) =1" indication in a protocol data unit (PDU) received form the AP. In some embodiments, the use of the "More Data=0" indication and/or the "EOSP=1" indication can apply for quality of service (QoS) transmissions only.

An implicit power management mode and/or power management state transition mechanism can reduce an amount of traffic loading on a WLAN by avoiding explicit frame exchanges using particular power management (PM) bit values, by not requiring polling frames for power save mode transitions, and/or by not using triggered data frames for power save mode transitions. Power consumption by a STA that uses the implicit power management and/or power management state transition mechanism can be reduced relative to a STA that uses explicit power management state/mode transitions, as transmission of the frame exchanges to realize the transitions is not required. The implicit power management mode and/or state transition mechanisms described in further detail herein can be adapted for use as part of a power save mode protocol to transition between an "active" mode and a "power save" mode as well as for state transitions between an "awake" state and a "doze" state within a power save mode, such as for an AP and STA that use power save (PS) polling and/or use an unscheduled automatic power save delivery (U-APSD) feature to conserve power.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates an example wireless communication system 100, in accordance with some embodiments. The wireless communication system 100 can include a set of client devices 102A, 102B, and 102C, which can also be referred to as stations, client wireless devices, or client wireless communication devices, interconnected to an access point (AP) 104. The client devices 102A, 102B, and 102C can be any wireless communication device that can be capable of communicating via a wireless local area network (WLAN) technology, e.g., in accordance with a wireless local area network communication protocol. In some embodiments, the WLAN technology can include a Wi-Fi (or more generically a WLAN) wireless communication subsystem or radio, and the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. By way of non-limiting example, the client devices 102A, 102B, and 102C can be embodied as a cellular phone, such as a smart phone device, a tablet computing device, a laptop computing device, a wearable computing device, and/or other computing device that can be configured to communicate over a WLAN connection.

In some embodiments, the client devices 102A, 102B, and 102C can also communicate in accordance with a wireless cellular communication protocol with a cellular wireless network (not shown). The client devices 102A, 102B, and 102C can communicate with a network 108, e.g., the "Internet," via the WLAN access point 104. The set of client devices 102A, 102B, and 102C together with the WLAN access point 104 can form a basic service set (BSS) 106 and can communicate using a common radio frequency channel specified by a WLAN communication protocol, e.g., an 802.11 radio frequency channel of a Wi-Fi communication protocol. The BSS can be identified uniquely by a basic service set identifier (BSSID), which in some embodiments can include a medium access control (MAC) address of the WLAN access point 104. The set of 802.11 Wi-Fi communication protocols utilize radio frequency spectrum in the Industrial, Scientific, and Medical (ISM) radio frequency bands, e.g., from 2.4 to 2.5 GHz, as well as the "5 GHz" radio frequency band, e.g., spanning from approximately 4.9 to 5.8 GHz. The "higher" radio frequency bands can provide for wider radio frequency channels that offer more bandwidth and higher data rates. The "lower" radio frequency bands can provide a wider coverage area due to lower path loss and therefore greater range. Typically, client devices 102A/B/C and WLAN access points 104 offer the capability to operate in one or both radio frequency bands. Additional radio frequency bands are planned for future use, and wireless communication protocols are being developed and standardized to use additional radio frequency bands, including those radio frequency bands in the television "white space" frequencies, e.g. in the very high frequency (VHF) and ultra high frequency (UHF) bands, i.e., near 600 MHz, as well as at frequencies near 3.5 GHz.

Figure 2:
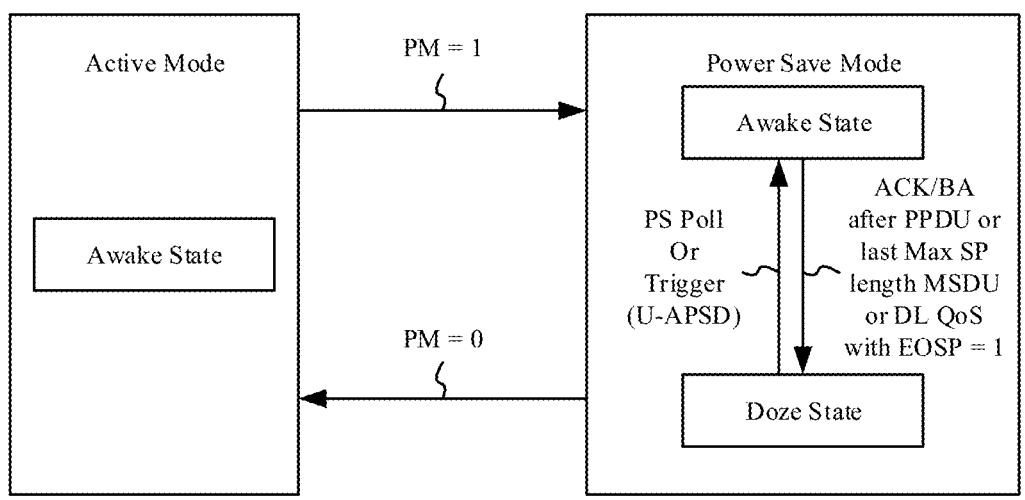
FIG. 2 illustrates exemplary power management mode/state transitions with explicit indications, in accordance with some embodiments.

FIG. 2 illustrates a diagram 200 of exemplary power management modes and power management states for a wireless communication device, such as for a client device 102, also referred to herein as a station (STA) 102, which communicates with an AP 104 in accordance with an existing IEEE 802.11 specification, such as IEEE 802.11-2012, which is incorporated by reference herein in its entirety for all purposes. The AP 104 maintains power management mode/state values for associated stations, such as STA 102. The AP 104 indicates the availability of buffered data units intended for a station, such as for STA 102, by setting a corresponding bit in the TIM IE of a beacon broadcast by the AP 104. To retrieve pending buffered data, the STA 102 can transition to the active mode or to the awake state of the power save mode. As the interval between beacon transmissions can be known, the STA can wake to listen for the beacon to ascertain whether data is pending and sleep in between otherwise to conserve power. The STA 102 changes between different power management modes by providing an indication to the AP 104 using a power management (PM) bit of a frame control field in a frame transmitted to the AP 104 by the STA 102. When the PM bit is set to 1, in a frame transmitted to the AP 104, the STA 102 indicates to the AP 104 that the STA 102 transitions from an active mode to a power save mode. As indicated in FIG. 2, while in the active mode, the STA 102 can be considered to be in the awake state at all times, while in the power save mode, the STA 102 can be in the awake state or in a doze state to conserve power. The STA 102 also indicates to the AP 104 that the STA 102 transitions from the power save mode to the active mode by setting the PM bit to 0 in a frame transmitted to the AP 104.

In addition, using a polling mechanism, the STA 102 can signal a transition from the doze state to the wake state while in the power save mode by sending to the AP 104 a PS poll, e.g., to retrieve a data frame from the AP 104 in response to an indication in the TIM information element of a beacon of pending data buffered at the AP 104 for the STA 102. The STA 102 can transition from the awake state back to the doze state while in the power save mode by sending an acknowledgement (ACK) or block acknowledgement (BA) to the AP 104 following successful reception of data frame the AP 104, e.g., in response to successful delivery of one Physical Layer Convergence Procedure (PLCP) Protocol Data Unit (PDU) or PPDU. To obtain additional data from the AP 104, the STA 102 can repeat sending a PS poll and after reception of the data replying to the AP 104 with an ACK/BA.

Alternatively, using an Unscheduled Asynchronous Power Save Delivery (U-APSD) mechanism, the STA 102 can transition from the doze state to the awake state of the power save mode by sending a Null data frame of a Quality of Service (QoS) Null data frame, e.g., as a "trigger" frame, to the AP 104 to trigger the AP 104 to send data to the STA 102. The STA 102 can remain in the awake state until receiving the "last Max service period (SP) length" downlink data frame or a downlink QoS data frame with an "end of service period" (EOSP) bit set to 1 and then transition to the doze state to conserve power after responding with a final ACK or BA to the AP 104. The number of downlink frames sent from the AP 104 to the STA 102 is no more than a "Max SP length" value; however, the AP 104 can end transmission earlier by sending a downlink QoS data frame to the STA 102 with the EOSP bit set to 1.

If the STA 102 does not have any uplink data frames to send to the AP 104, in which to include an indication for a power management mode transition, the STA 102 can opt to send a "Null Data" frame with a PM bit set accordingly. Similarly, when the STA 102 has not uplink data frames to send to the AP 104, the STA 102 can send a Quality of Service (QoS) "Null Data" frame to the AP 104 to indicate a transition from the doze state to the awake state within the power save mode.

For existing 802.11 power management mechanisms, the STA 102 can be required to indicate explicitly transitions between power management modes, e.g., using the PM bit, and between power management states of the power save mode, e.g., using PS poll or trigger frames to indicate waking (transitioning to the awake state from the doze state) and providing ACK/BA to indicate returning to sleep (transitioning from the awake state to the doze state). Thus, changes in power management modes or power management states can be initiated by the STA 102 and explicitly indicated to the AP 104 by using a frame exchange handshake, with one frame exchange required for each power management mode transition or power management state transition. When operating in a congested wireless network environment, the STA 102 can be delayed from entering a more power efficient state by having to send an explicit indication of a power management mode transition or a power management state transition, thus increasing power consumption by the STA 102. In addition, the added signaling traffic used to indicate explicitly the power management mode or state transition adds to loading of the wireless network. As described in further detail herein, a "high efficiency" (HE) AP 104 and an HE STA 102 can use implicit power management mode and/or state transitions to indicate indirectly that the HE STA 102 transitions between an active mode and a power save mode and/or between an awake state and a doze state of the power save mode.

Figure 3:
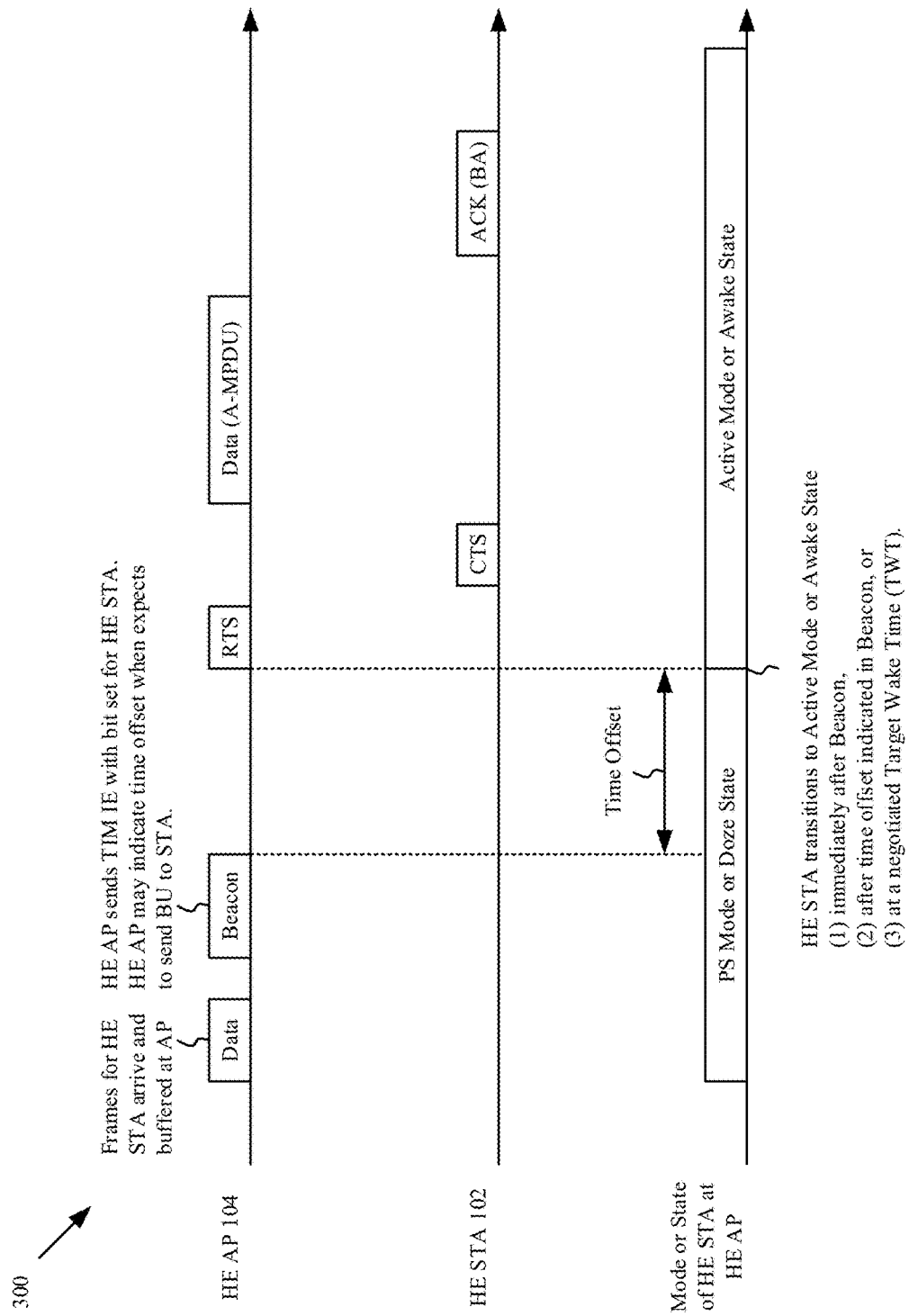
FIGS. 3 to 5 illustrate exemplary implicit power management mode/state transitions, in accordance with some embodiments.

FIG. 3 illustrates a diagram 300 of an exemplary implicit power management mode/state transition from a power save (PS) mode or doze state to an active mode or awake state by an HE STA 102 associated with an HE AP 104, in accordance with some embodiments. The HE AP 104 can receive data frames for the HE STA 102, which can be in the PS mode or in a doze state of the PS mode, and the HE AP 104 can buffer the received data frames before providing an indication of the buffered received data frames to the HE STA 102, e.g., by setting a bit for the HE STA 102 in the TIM IE of a broadcasted beacon signal. The beacon signal can also include a time offset indication that provides information to the HE STA 102 about when the HE AP 104 expects to send the buffered data frames to the HE STA 102. The HE STA 102, while in the PS mode or in the doze state of the PS mode, can wake periodically to check the TIM IE of beacon signals broadcast by the HE AP 194 to check whether the HE AP 104 has any buffered data frames to send to the HE AP 104. When the HE STA 102 determines that the TIM IE bit corresponding to the HE STA 102 is set to indicate pending data buffered at the HE AP 104 for the HE STA 102, e.g., the TIM IE bit for the HE STA 102 is set to "1", the HE STA 102 can transition from the PS mode to the active mode or from the doze state of the PS mode to the awake state of the PS mode. The transition of the HE STA 102 can occur implicitly without the HE STA 102 indicating the transition to the HE AP 104 explicitly. The HE AP 104 can assume that the HE STA 102 will transition from the PS mode to the active mode or from the doze state of the PS mode to the awake state of the PS mode at a future time after the beacon signal transmission. The HE STA 102 can transition from the PS mode to the active mode or from the doze state to the awake state in the PS mode in anticipation of the HE AP 104 sending the buffered data frames to the HE STA 102. Both the HE AP 104 and the HE STA 102 can recognize that implicit power management mode/state transitions can be used, e.g., based on an exchange of capabilities during an association of the HE STA 102 with the HE AP 104 and/or based on a stored database of capability information for the HE STA 102 and/or the HE AP 104 accessible by the HE STA 102 and/or by the HE AP 104.

The implicit transition of the HE STA 102 from the PS mode to the active mode or from the doze state of the PS mode to the awake state of the PS mode can occur (1) immediately after the beacon signal transmission, (2) at a time based on a time offset indicated in the beacon signal transmission, or (3) at a negotiated time, such as a target wake time (TWT), known by the HE AP 104 and the HE STA 102, which can be determined in some embodiments during an association of the HE STA 102 with the HE AP 104 and/or based on information for the HE STA 102 accessible by the HE AP 104 and/or the HE STA 102. In some embodiments, a particular IE in the beacon signal transmission indicates the time offset for the HE STA 102. In some embodiments, the time offset indicated in the beacon signal transmission applies to the HE STA 102 only and not to other stations 102 that are associated with the HE AP 104. In some embodiments, the time offset indicated in the beacon signal transmission applies for any data transmissions sent to the HE STA 102 after the beacon signal transmission until the HE STA 102 returns to the doze state of the power save mode or from the active mode to the power save mode. The HE STA 102 can transition immediately after the beacon transmission to ensure readiness to receive the data frames from the HE AP 104, or can wait until after the time offset or at the TWT to continue to remain in a power efficient state to conserve power before changing to the active mode or the awake state of the power save mode. In some embodiments the TWT corresponds to a negotiated target wake time or set of times as defined in an 802.11ah wireless communication protocol specification. The HE AP 104 can transmit a request to send (RTS) indication to the HE STA 102 and wait to receive a clear to send (CTS) indication in reply from the HE STA 102 before sending the buffered data frames to the HE STA 102, e.g., to ensure that the HE STA 102 is in the active mode or the awake state of the power save mode before transmitting the buffered data frames. In some embodiments, the data frames transmitted by the HE AP 104 to the HE STA 102 include a data frame, which can also be referred to as a PLCP PDU (PPDU), and the HE STA 102 responds to correct reception of the PPDU with an acknowledgement (ACK) message sent to the HE AP 104. In some embodiments, the data frames transmitted by the HE AP 104 to the HE STA 102 include an aggregated media access control (MAC) PDU (A-MPDU), which aggregates multiple Ethernet frames in an 802.11n MAC header, and the HE STA 102 responds to correct reception of the A-MPDU with a block acknowledgement (BA) message sent to the HE AP 104.

Figure 4:
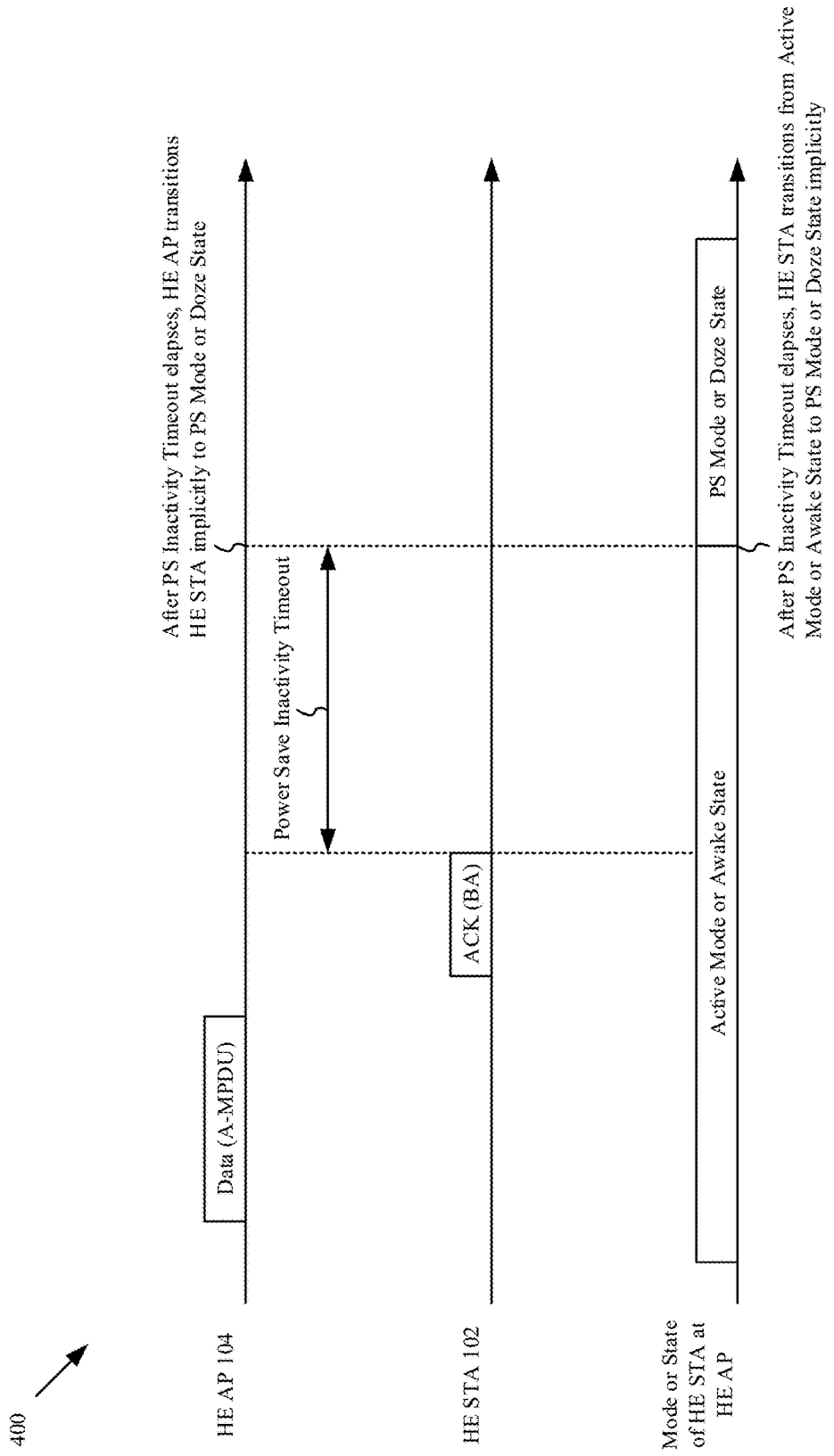

FIG. 4 illustrates a diagram 400 of an exemplary implicit power management mode/state transition from an active mode or an awake state of a PS mode to the PS mode or a doze state of the PS mode by an HE STA 102 associated with an HE AP 104, in accordance with some embodiments. After the HE AP 104 transmits data frames successfully to the HE STA 102 and receives an acknowledgement or block acknowledgement from the HE STA 102 in response to the transmitted data frames, the HE AP 104 can transition the power management mode or state of the HE STA 102 implicitly from the active mode or awake state of the PS mode to the PS mode or to the doze state of the PS mode. In some embodiments, the HE STA 102 determines that no additional data frames are to be sent (or expected) from the HE AP 104 to the HE STA 102 and therefore the HE STA 102 need not remain in the active mode or wake state of the PS mode. In some embodiments, the HE STA 102 can determine this lack of data frames indirectly, e.g., based on a lack of a successful exchange of a PPDU with the HE AP 104 during a power save inactivity timeout period following a last ACK or BA message sent by the HE STA 102 to the HE AP 104. After the power save inactivity timeout period, the HE STA 102 can transition implicitly from the active mode to the PS mode or from the awake state of the PS mode to the doze state of the PS mode, without the HE STA 102 providing an explicit indication of the transition to the HE AP 104. Similarly the HE AP 104 can transition implicitly the power management mode and/or power management state information of the HE STA 102 maintained at the HE AP 104 from the active mode to the PS mode or from the awake state of the PS mode to the doze state of the PS mode. In some embodiments, the power save inactivity timeout period spans ten's of milliseconds, e.g., between 50 and 250 milliseconds. In some embodiments, the power save inactivity timeout period spans a time period of one to two beacon intervals. In some embodiments, the HE STA 102 determines a value for the power save inactivity timeout period based on information provided by the HE AP 104, e.g., during an initial association and/or broadcast or unicast by the HE AP 104 to the HE STA 102. In some embodiments, the HE AP 104 and/or the HE STA 102 uses a power save inactivity timeout timer that is set by the HE STA 102 after sending the ACK or BA to the HE AP 104 and is reset upon successful reception of an additional data frame during the same active mode or awake state time period. In some embodiments, when a power save inactivity timeout timer expires at the HE STA 102, which can indicate no successful reception of data frames from the HE AP 104 by the HE STA 102 for at least the power save inactivity timeout period, the HE STA 102 can transition implicitly to the PS mode or the doze state of the PS mode. Similarly, in some embodiments, when a power save inactivity timeout timer expires at the HE AP 104, the HE AP 104 can change a power management mode or state maintained at the HE AP 104 for the HE STA 102 from the active mode to the PS mode or from the awake state of the PS mode to the doze state of the PS mode.

Figure 5:
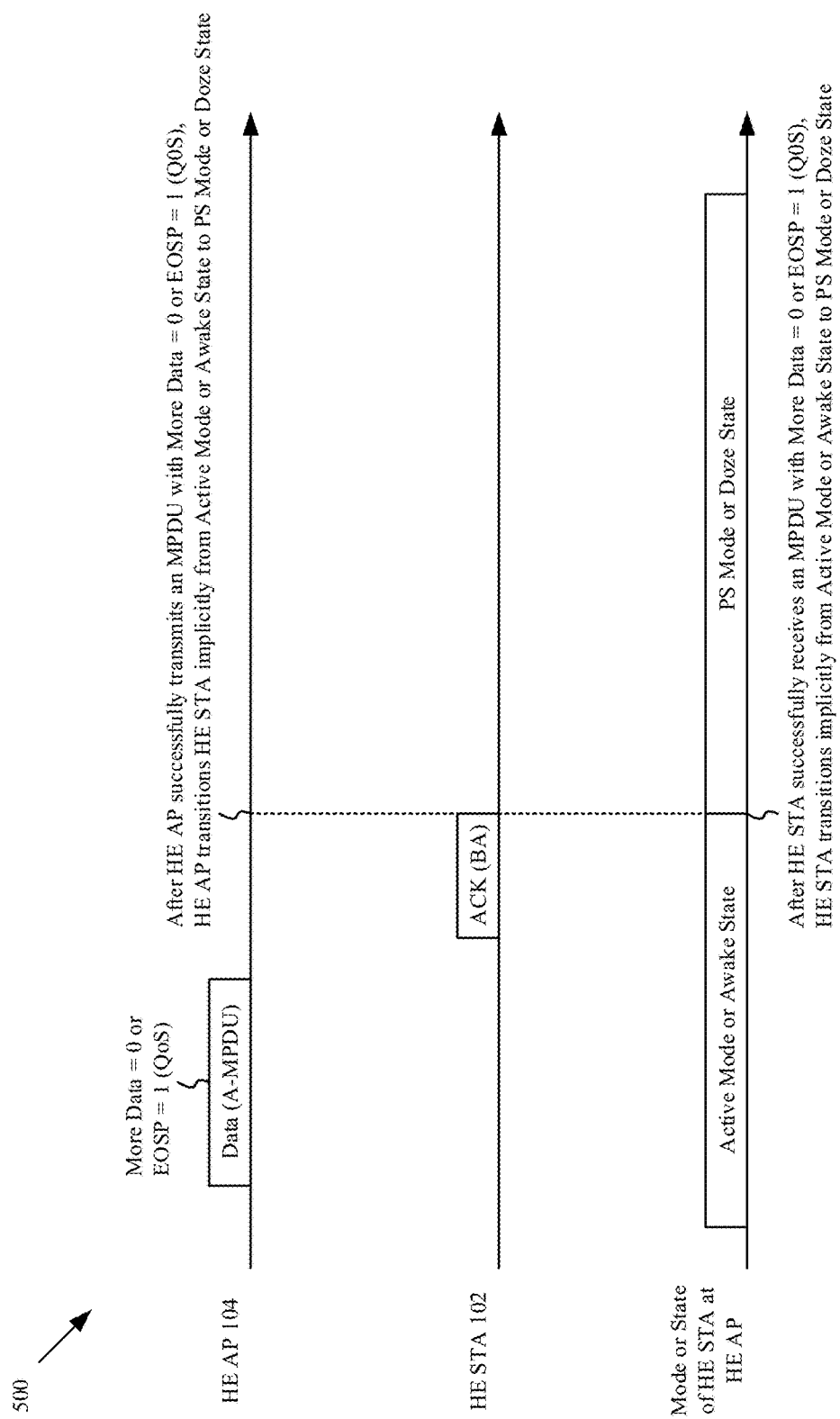

FIG. 5 illustrates another diagram 500 of an exemplary implicit power management mode/state transition from an active mode or an awake state of a PS mode to the PS mode or a doze state of the PS mode by an HE STA 102 associated with an HE AP 104, in accordance with some embodiments. As in FIG. 4, after the HE AP 104 transmits data frames successfully to the HE STA 102 and receives an ACK or BA from the HE STA 102 in response to the transmitted data frames, the HE AP 104 can transition the power management mode or state of the HE STA 102 implicitly from the active mode or awake state of the PS mode to the PS mode or to the doze state of the PS mode. In some embodiments, the HE STA 102 can determine that no additional data frames are expected directly, e.g., based on successful reception of an MPDU from the HE AP 104 that includes an indication of no more data, such as a "More Data" bit set to "0", or based on successful reception of a QoS MPDU from the HE AP 104 that includes an indication that a service period is complete, such as an End of Service Period (EOSP) bit set to "1". After reception of a PDU with an indication that data transmission is complete, the HE STA 102 can transition implicitly from the active mode to the PS mode or from the awake state of the PS mode to the doze state of the PS mode, without the HE STA 102 providing an explicit indication of the transition to the HE AP 104. The HE AP 104 can also transition a power management mode and/or state indication for the HE STA 102 maintained at the HE AP 104 from the active mode to the PS mode or from the awake state of the PS mode to the doze state of the PS mode after receiving the ACK or BA from the HE STA 102 in response to the indication of the "end" of data transmission, e.g., based on the "More Data"=0 or the EOSP=1 (for QoS only) indication. By using a direct indication of no additional data or an end of a service period, the HE AP 104 can transition the HE STA 102 implicitly to a more power efficient power management mode or state more quickly than waiting for elapse of a power save timeout period (or expiration of a power save timeout timer).

By using an implicit power management mode or state transition, the HE STA 102 can more quickly enter a more power efficient state and remain in the power efficient state longer than when required to use explicit indications of power management mode or state transitions to the HE AP 104. The HE AP 104 can maintain an accurate power management mode or state indication for the HE STA 102 by recognizing that the HE STA 102 supports use of implicit power management mode or state transitions. The implicit power management mode or state transition mechanism reduces loading of signaling traffic on the WLAN by not requiring use of a frame exchange between the HE STA 102 and the HE AP 104 as used for explicit power management mode or state transmission mechanisms, e.g., avoiding use of signaling frames with a power management (PM) bit to indicate power management mode changes, avoiding use of power save polling frames, and/or avoiding used of triggered data frames. Power consumption by the HE STA 102 can be reduced as the explicit power management mode or state change frame exchanges are not required thereby permitting the HE STA 102 to enter a more power efficient state more rapidly. The implicit power management mode or state mechanism described herein can apply to power management mode transitions, e.g., between the active mode and the PS mode, or to power management state transitions, e.g., between the awake state and the doze state of the PS mode.

Figure 6:
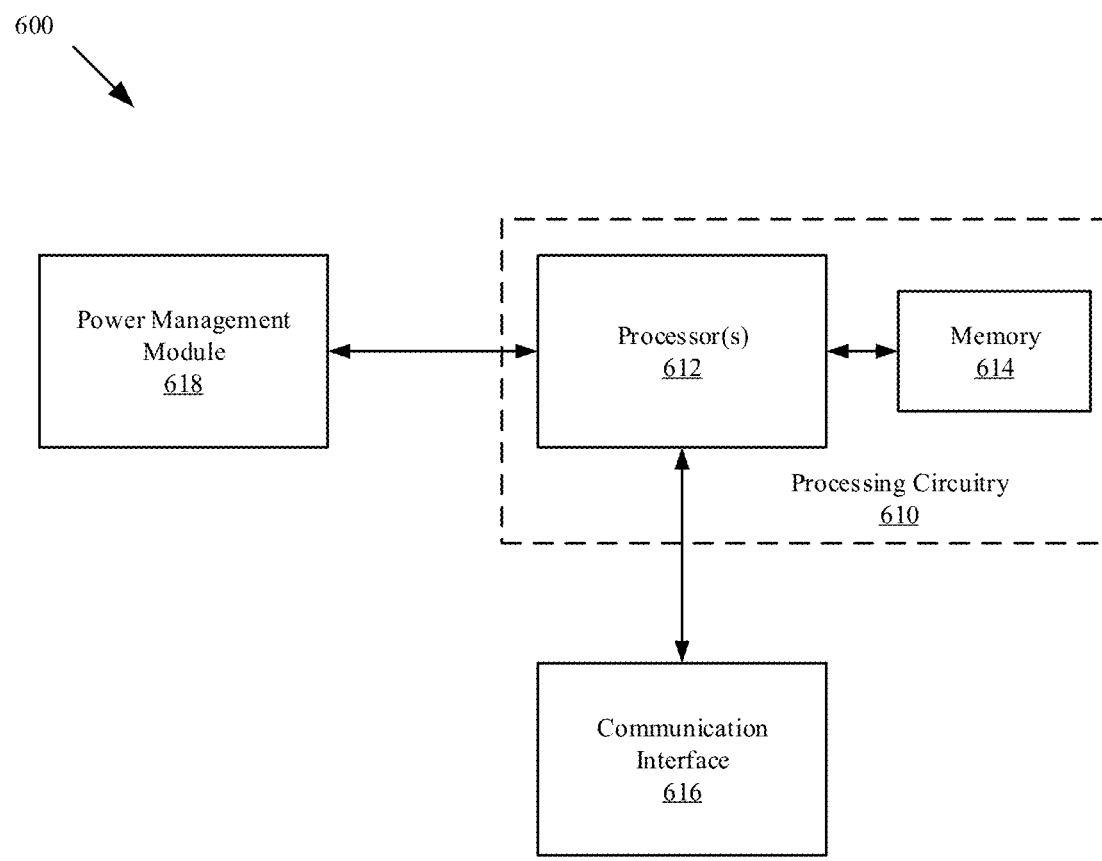
FIG. 6 illustrates an example representative set of elements of a wireless communication device, in accordance with some embodiments.

FIG. 6 illustrates a block diagram of an example apparatus 600 that can be implemented on a client device, such as the HE STA 102, and/or on an access point, such as the HE AP 104, to realize, at least in part, an implicit power management mode/state transition mechanism, in accordance with some embodiments. It will be appreciated that the components, devices or elements illustrated in and described with respect to FIG. 6 may not be mandatory and thus some may be omitted in certain embodiments. Additionally, some embodiments can include further or different components, devices or elements beyond those illustrated in and described with respect to FIG. 6. Further, it will be appreciated that, in some embodiments, one or more components of the apparatus 600 can be distributed across a plurality of computing devices that can collectively provide the functionality of an HE STA 102 and/or an HE AP 104.

In some example embodiments, the apparatus 600 can include processing circuitry 610 that is configurable to perform actions in accordance with one or more example embodiments disclosed herein. In this regard, the processing circuitry 610 can be configured to perform and/or control performance of one or more functionalities of the apparatus 600 in accordance with various embodiments, and thus can provide means for performing functionalities of the apparatus 600 in accordance with various embodiments. The processing circuitry 610 can be configured to perform data processing, application execution and/or other processing and management services according to one or more embodiments.

In some embodiments, the apparatus 600 or a portion(s) or component(s) thereof, such as the processing circuitry 610, can include one or more chipsets, each of which can include one or more chips. The processing circuitry 610 and/or one or more further components of the apparatus 600 can therefore, in some instances, be configured to implement an embodiment on a chipset comprising one or more chips. In some example embodiments in which one or more components of the apparatus 600 are embodied as a chipset, the chipset can be capable of enabling a computing device(s) to operate as an offload coordination service server 116 when implemented on or otherwise operably coupled to the computing device(s).

In some example embodiments, the processing circuitry 610 can include a processor 612 and, in some embodiments, such as that illustrated in FIG. 6, can further include memory 614 (or another non-transitory storage medium). The processing circuitry 610 can be in communication with or otherwise control a communication interface 616 and/or a power management module 618.

The processor 612 can be embodied in a variety of forms. For example, the processor 612 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 612 can include a plurality of processors. The plurality of processors can be in operative communication with each other and can be collectively configured to perform one or more functionalities of the apparatus 600 as described herein. In embodiments including a plurality of processors, the plurality of processors can be implemented on a single computing device, or can be distributed across a plurality of computing devices that can collectively provide functionality of a client device, such as the HE STA 102, or an access point, such as the HE AP 104. In some example embodiments, the processor 612 can be configured to execute instructions that can be stored in the memory 614 or that can be otherwise accessible to the processor 612. As such, whether configured by hardware or by a combination of hardware and software, the processor 612 can be capable of performing operations according to various embodiments while configured accordingly.

In some embodiments, the memory 614 can include one or more memory devices. The memory 614 can include fixed and/or removable memory devices. In some embodiments, the memory 614 can provide a non-transitory computer-readable storage medium that can store computer program instructions that can be executed by the processor 612. In this regard, the memory 614 can be configured to store information, data, applications, instructions and/or the like for enabling the apparatus 600 to carry out various functions in accordance with one or more embodiments. In embodiments including a plurality of memory devices, the plurality of memory devices can be implemented on a single computing device, or can be distributed across a plurality of computing devices that can collectively provide functionality of a client device, such as the HE STA 102, or an access point, such as the HE AP 104. In some embodiments, the memory 614 can be in communication with one or more of the processor 612, communication interface 616, or power management module 618 via one or more busses for passing information among components of the apparatus 600.

The apparatus 600 can further include a communication interface 616. The communication interface 616 can include one or more interface mechanisms for enabling communication with other devices and/or networks. For example, the communication interface 616 can be configured to enable the apparatus 600 to communicate over the network 108. The apparatus 600 can include multiple communication interfaces 616, which can each provide communication in accordance with a communication protocol, e.g., a wireless communication protocol. In various embodiments, the communication interface 616 can include, for example, an antenna (or multiple antennas) and supporting hardware and/or software for enabling communications with one or more wireless communication networks, such as a cellular network, and/or a communication modem or other hardware/software for supporting communication via cable, digital subscriber line (DSL), USB, FireWire, Ethernet or other wire-line networking methods. In some embodiments, the communication interface 616 can be referred to as wireless circuitry and include a combination of requisite hardware, software, or firmware to provide wireless communications in accordance with one or more wireless communication protocols, such as a Wi-Fi protocol or an IEEE 802.11 wireless communication protocol.

The apparatus 600 can further include a power management module 618. The power management module 618 can be embodied as various means, such as circuitry, hardware, a computer program product comprising computer readable program instructions stored on a non-transitory computer readable medium (for example, the memory 614) and executed by a processing device (for example, the processor 612), or some combination thereof. In some embodiments, the processor 612 (or the processing circuitry 610) can include, or otherwise control the power management module 618. The power management module 618 can be configured to support power management mode or state transitions of a client device, such as the HE STA 102, in communication with an access point, e.g., the HE AP 104, as described herein, and/or other functions that can be performed by a client device, such as the HE STA 102, and/or an access point, such as the HE AP 104, in support of one or more example embodiments.

Representative Embodiments

In an embodiment, a method to transition a power management mode or a power management state for a wireless station associated with a wireless access point includes the wireless access point: (i) buffering at least one data frame for transmission to the wireless station; (ii) transmitting a beacon signal including a traffic indication map information element that indicates the at least one data frame buffered for transmission to the wireless station; and (iii) without waiting for a power management mode or state change indication from the wireless station, after completing transmission of the beacon signal, either transitioning the power management mode for the wireless station from a power save mode to an active mode, or transitioning the power management state for the wireless station from a doze state to an awake state of the power save mode, and transmitting one or more data frames of the at least one data frame to the wireless station.

In some embodiments, the beacon signal includes an indication of a time offset. In some embodiments, the wireless access point waits for at least the time offset, after transmitting the beacon signal, before transitioning the power management mode for the wireless station to the active mode or the power management state for the wireless station to the awake state of the power save mode. In some embodiments, the method performed by the wireless access point further includes: transmitting a request to send indication to the wireless station; and waiting to receive a clear to send indication from the wireless station before transmitting the one or more data frames to the wireless station. In some embodiments, the wireless access point transitions the power management mode for the wireless station to the active mode or the power management state for the wireless station to the awake state of the power save mode immediately after completing transmission of the beacon signal. In some embodiments, the wireless access point transitions the power management mode for the wireless station to the active mode or the power management state for the wireless station to the awake state of the power save mode at a target wake time negotiated between the wireless access point and the wireless station. In some embodiments, the method performed by the wireless access point further includes receiving an acknowledgement from the wireless station in response to the one or more data frames transmitted to the wireless station; and transitioning the power management mode for the wireless station from the active mode to the power save mode or the power management state for the wireless station from the awake state to the doze state of the power save mode after a power save inactivity timeout period following receipt of the acknowledgement from the wireless station and without waiting for a subsequent power management mode or state change indication from the wireless station. In some embodiments, the one or more data frames transmitted to the wireless station include an indication of no more pending data or an end of service period indication for the wireless station. In some embodiments, the method performed by the wireless access point further includes receiving an acknowledgement from the wireless station in response to one or more data frames transmitted to the wireless station; and transitioning the power management mode for the wireless station from the active mode to the power save mode or the power management state for the wireless station from the awake state to the doze state of the power save mode immediately after receipt of the acknowledgement from the wireless station and without waiting for a subsequent power management mode or state change indication from the wireless station.

In an embodiment, a method to transition a power management mode or state of a wireless station associated with a wireless access point, the method performed by the wireless station, includes: (i) receiving a beacon signal including a traffic indication map information element that indicates at least one data frame buffered at the wireless access point for transmission to the wireless station; and (ii) without sending a power management mode or state change indication to the wireless access point, after receipt of the beacon signal, transitioning the power management mode of the wireless station from a power save mode to an active mode, or transitioning the power management state of the wireless station from a doze state to an awake state of the power save mode, and receiving one or more data frames of the at least one data frame from the wireless access point.

In some embodiments, the beacon signal includes an indication of a time offset, and the wireless station waits for at least the time offset, after receiving the beacon signal, before transitioning the power management mode of the wireless station to the active mode or the power management state of the wireless station to the awake state of the power save mode. In some embodiments, the method performed by the wireless station further includes transmitting a clear to send indication to the wireless access point in response to receipt of a request to send indication from the wireless access point. In some embodiments, the wireless station transitions the power management mode of the wireless station to the active mode or the power management state of the wireless station to the awake state of the power save mode immediately after receipt of the beacon signal. In some embodiments, the wireless station transitions the power management mode of the wireless station to the active mode or the power management state of the wireless station to the awake state of the power save mode at a target wake time negotiated between the wireless station and the wireless access point. In some embodiments, the method performed by the wireless station further includes: transmitting an acknowledgement to the wireless access point in response to receipt of the one or more data frames from the wireless access point; and transitioning the power management mode of the wireless station from the active mode to the power save mode or the power management state of the wireless station from the awake state to the doze state of the power save mode after a power save inactivity timeout period following transmission of the acknowledgement to the wireless access point and without sending a power management mode or state change indication to the wireless access point. In some embodiments, the one or more data frames received from the wireless access point include an indication of no pending data or an end of service period indication for the wireless station. In some embodiments, the method performed by the wireless station further includes transmitting an acknowledgement to the wireless access point in response to receipt of the one or more data frames from the wireless access point; and transitioning the power management mode of the wireless station from the active mode to the power save mode or the power management state of the wireless station from the awake state to the doze state of the power save mode immediately after transmission of the acknowledgement to the wireless access point and without sending a power management mode or state change indication to the wireless access point.

In an embodiment, a wireless station includes (i) a communication interface configurable to communicate with an access point via one or more antennas; (ii) a power management module; and (iii) processing circuitry, including one or more processors and memory, communicatively coupled to the power management module and the communication interface and configured to cause the wireless station to: receive a beacon signal including a traffic indication map information element that indicates at least one data frame buffered at the wireless access point for transmission to the wireless station; and without sending a power management mode or state change indication to the wireless access point, after receipt of the beacon signal: transition the power management mode of the wireless station from a power save mode to an active mode, or transition the power management state of the wireless station from a doze state to an awake state of the power save mode, and receive one or more data frames of the at least one data frame from the wireless access point.

In some embodiments, the beacon signal includes an indication of a time offset, and the wireless station waits for at least the time offset, after receiving the beacon signal, before transitioning the power management mode of the wireless station to the active mode or the power management state of the wireless station to the awake state of the power save mode. In some embodiments, the processing circuitry is further configured to cause the wireless station to transmit a clear to send indication to the wireless access point in response to receipt of a request to send indication from the wireless access point. In some embodiments, the wireless station transitions the power management mode of the wireless station to the active mode or the power management state of the wireless station to the awake state of the power save mode immediately after receipt of the beacon signal. In some embodiments, the wireless station transitions the power management mode of the wireless station to the active mode or the power management state of the wireless station to the awake state of the power save mode at a target wake time negotiated between the wireless station and the wireless access point. In some embodiments, the processing circuitry of the wireless station is further configured to cause the wireless station to: transmit an acknowledgement to the wireless access point in response to receipt of the one or more data frames from the wireless access point; and transition the power management mode of the wireless station from the active mode to the power save mode or the power management state of the wireless station from the awake state to the doze state of the power save mode after a power save inactivity timeout period following transmission of the acknowledgement to the wireless access point and without sending a power management mode or state change indication to the wireless access point. In some embodiments, the processing circuitry of the wireless station is further configured to cause the wireless station to: transmit an acknowledgement to the wireless access point in response to receipt of the one or more data frames from the wireless access point; and transition the power management mode of the wireless station from the active mode to the power save mode or the power management state of the wireless station from the awake state to the doze state of the power save mode immediately after transmission of the acknowledgement to the wireless access point and without sending a power management mode or state change indication to the wireless access point.

In an embodiment, an integrated circuit apparatus includes processing circuitry that includes one or more processors and memory communicatively coupled to a power management module and configurable for operation in a wireless station. The processing circuitry is configured to cause a wireless station to: receive a beacon signal including a traffic indication map information element that indicates at least one data frame buffered at a wireless access point for transmission to the wireless station; and without sending a power management mode or state change indication to the wireless access point, after receipt of the beacon signal: transition the power management mode of the wireless station from a power save mode to an active mode, or transition the power management state of the wireless station from a doze state to an awake state of the power save mode, and receive one or more data frames of the at least one data frame from the wireless access point.

In some embodiments, the beacon signal includes an indication of a time offset, and the processing circuitry is configured to cause the wireless station to wait for at least the time offset, after receiving the beacon signal, before transitioning the power management mode of the wireless station to the active mode or the power management state of the wireless station to the awake state of the power save mode. In some embodiments, the processing circuitry is further configured to cause the wireless station to transmit a clear to send indication to the wireless access point in response to receipt of a request to send indication from the wireless access point. In some embodiments, the processing circuitry is configured to cause the wireless station to transition the power management mode of the wireless station to the active mode or the power management state of the wireless station to the awake state of the power save mode immediately after receipt of the beacon signal. In some embodiments, the processing circuitry is configured to cause the wireless station to transition the power management mode of the wireless station to the active mode or the power management state of the wireless station to the awake state of the power save mode at a target wake time negotiated between the wireless station and the wireless access point. In some embodiments, the processing circuitry of the wireless station is further configured to cause the wireless station to: transmit an acknowledgement to the wireless access point in response to receipt of the one or more data frames from the wireless access point; and transition the power management mode of the wireless station from the active mode to the power save mode or the power management state of the wireless station from the awake state to the doze state of the power save mode after a power save inactivity timeout period following transmission of the acknowledgement to the wireless access point and without sending a power management mode or state change indication to the wireless access point. In some embodiments, the processing circuitry of the wireless station is further configured to cause the wireless station to: transmit an acknowledgement to the wireless access point in response to receipt of the one or more data frames from the wireless access point; and transition the power management mode of the wireless station from the active mode to the power save mode or the power management state of the wireless station from the awake state to the doze state of the power save mode immediately after transmission of the acknowledgement to the wireless access point and without sending a power management mode or state change indication to the wireless access point.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The various aspects, embodiments, implementations or features of the described embodiments can be used separately or in any combination. Various aspects of the described embodiments can be implemented by software, by hardware, or by a combination of hardware and software. The described embodiments can also be embodied as computer readable code on non-transitory a computer readable medium. The non-transitory computer readable medium is any data storage device that can store data, which can thereafter be read by a computer system. Examples of the computer readable medium include read-only memory, random-access memory, CD-ROMs, HDDs, DVDs, magnetic tape, and optical data storage devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless station comprising:
a communication interface configurable to communicate with a wireless access point via one or more antennas;
a power management module; and
processing circuitry, comprising one or more processors and memory, communicatively coupled to the power management module and the communication interface and configured to cause the wireless station to:
determine, during an association procedure, whether a wireless access point supports an implicit power management transition mode;
receive, during the association procedure, a value for a power save inactivity timeout period from the wireless access point;
receive, while in a power reduced state from the wireless access point, a beacon signal indicating at least one data frame buffered for transmission to the wireless station;
transition, at a specific target wake time (TWT) of a set of specific TWTs negotiated and agreed upon between the wireless station and the wireless access point during the association procedure, when the wireless access point supports the implicit power management transition mode, from the power reduced state to an awake state without sending a power management mode or state change indication to the wireless access point;
receive, after transitioning at the TWT, one or more data frames of the at least one data frame from the wireless access point; and
transition from the awake state to the power reduced state after the power save inactivity timeout period after transmitting an acknowledgement to the wireless access point in response to receipt of the one or more data frames.

2. The wireless station of claim 1, wherein the power save inactivity timeout period spans a time period of one to two beacon intervals.

3. The wireless station of claim 1, wherein the power save inactivity timeout period spans a time period of tens to hundreds of milliseconds.

4. The wireless station of claim 1, wherein the power reduced state comprises a doze state of a power save mode.

5. The wireless station of claim 1, wherein the wireless station transitions from the awake state to the power reduced state after the power save inactivity timeout period without sending a power management mode or state change indication to the wireless access point.

6. The wireless station of claim 1, wherein a final data frame of the one or more data frames comprises a Quality of Service (QoS) media access control (MAC) protocol data unit (PDU) that includes an End of Service Period (EOSP) bit value to cause the wireless station to:
transmit an acknowledgement to the wireless access point; and
transition the wireless station to the power reduced state.

7. A method for power efficient data reception by a wireless station, the method comprising:
by the wireless station:
determining, during an association procedure, whether a wireless access point supports an implicit power management transition mode;
receiving, during the association procedure, a value for a power save inactivity timeout period from the wireless access point;
receiving, while in a power reduced state from the wireless access point, a beacon signal indicating at least one data frame buffered for transmission to the wireless station;
transitioning, at a specific target wake time (TWT) of a set of specific TWTs negotiated and agreed upon between the wireless station and the wireless access point during the association procedure, when the wireless access point supports the implicit power management transition mode, from the power reduced state to an awake state without sending a power management mode or state change indication to the wireless access point;

receiving, after the transitioning at the TWT, one or more data frames of the at least one data frame from the wireless access point; and transitioning from the awake state to the power reduced state after the power save inactivity timeout period after transmitting an acknowledgement to the wireless access point in response to receipt of the one or more data frames.

8. The method of claim 7, wherein the power save inactivity timeout period spans a time period of one to two beacon intervals.

9. The method of claim 7, wherein the power save inactivity timeout period spans a time period of tens to hundreds of milliseconds.

10. The method of claim 7, wherein the power reduced state comprises a doze state of a power save mode.

11. The method of claim 7, wherein the wireless station transitions from the awake state to the power reduced state after the power save inactivity timeout period without sending a power management mode or state change indication to the wireless access point.

12. The method of claim 7, wherein a final data frame of the one or more data frames comprises a Quality of Service (QoS) media access control (MAC) protocol data unit (PDU) that includes an End of Service Period (EOSP) bit value to cause the wireless station to:

transmit an acknowledgement to the wireless access point; and transition the wireless station to the power reduced state.

13. A method for power efficient data transfer to a wireless station, the method comprising:

by a wireless access point:

determining, during an association procedure, whether a wireless station supports an implicit power management transition mode;

providing to the wireless station a value for a power save inactivity timeout period from the wireless access point during the association procedure;

transmitting, to the wireless station, a beacon signal indicating at least one data frame buffered for transmission to the wireless station;

transitioning, at a specific target wake time (TWT) of a set of specific TWTs negotiated and agreed upon between the wireless station and the wireless access point during the association procedure, when the wireless station supports the implicit power management transition mode, a power management mode maintained for the wireless station from a power reduced state to an awake state;

transmitting, after the transitioning at the TWT, one or more data frames of the at least one data frame to the wireless station; and transitioning the power management mode maintained for the wireless station from the awake state to the power reduced state after the power save inactivity timeout period after receipt of an acknowledgement from the wireless station that is responsive to the one or more data frames.

14. The method of claim 13, further comprising:

by the wireless access point:

transmitting, after transitioning at the TWT, a request to send indication to the wireless station; and waiting to receive a clear to send indication from the wireless station before transmitting the one or more data frames to the wireless station.

15. The method of claim 13, wherein the wireless access point transitions the power management mode maintained for the wireless station at the TWT without waiting for a power management mode or state change indication from the wireless access point.

16. The method of claim 13, wherein the power save inactivity timeout period spans a time period of one to two beacon intervals.

17. The method of claim 13, wherein a final data frame of the one or more data frames comprises a Quality of Service (QoS) media access control (MAC) protocol data unit (PDU) that includes an End of Service Period (EOSP) bit value to cause the wireless station to:

transmit an acknowledgement to the wireless access point; and transition the wireless station to the power reduced state.

18. The method of claim 13, wherein the power reduced state comprises a doze state of a power save mode.

19. The method of claim 13, wherein the power save inactivity timeout period spans a time period of tens to hundreds of milliseconds.

* * * * *